(12) United States Patent  
Williams (10) Patent No.: US 6,443,529 B1
(45) Date of Patent: Sep. 3, 2002

(54) ASSEMBLY WITH A NON-ROTATABLE WHEEL COVER DISC

(76) Inventor: Curtis A. Williams, 2916 Crane School House Rd., Bethel, OH (US) 45106

( * ) Notice: Subject to any disclaimer, the term of this patent is extended or adjusted under 35 U.S.C. 154(b) by 0 days.

(21) Appl. No.: 09/715,207

(22) Filed: Nov. 16, 2000

Related U.S. Application Data (60) Provisional application No. 60/199,165, filed on Aug. 17, 2000.

(51) Int. Cl.[7] ................................................. B60B 7/04
(52) U.S. Cl. .................................................. 301/37.25
(58) Field of Search ........................ 301/37.25, 37.101, 301/37.26, 37.109, 37.42

(56) References Cited

U.S. PATENT DOCUMENTS

| | | | | |
|---|---|---|---|---|
| 2,130,220 A | * | 9/1938 | Ball et al. ................. | 301/37.25 |
| 2,548,070 A | * | 4/1951 | Ryan ....................... | 301/37.25 |
| 2,741,047 A | | 4/1956 | Pollock | |
| 2,754,154 A | * | 7/1956 | Solow ...................... | 301/37.25 |
| 2,759,282 A | | 8/1956 | Lecourt | |
| 2,869,262 A | | 1/1959 | Lucas | |
| 2,954,629 A | | 10/1960 | Matin | |
| 3,457,663 A | | 7/1969 | Beaudoin et al. | |
| 3,495,347 A | | 2/1970 | Sims | |
| 3,918,186 A | | 11/1975 | Gray | |
| 4,280,293 A | | 7/1981 | Kovalenko et al. | |
| 4,678,239 A | * | 7/1987 | Matsushita ............... | 301/37.25 |
| 5,190,354 A | * | 3/1993 | Levy et al. ............... | 301/37.25 |
| 5,490,342 A | | 2/1996 | Rutterman et al. | |
| 5,588,715 A | * | 12/1996 | Harlen ..................... | 301/37.25 |
| 5,659,989 A | | 8/1997 | Hsiao et al. | |
| 5,957,542 A | * | 9/1999 | Boothe et al. ........... | 301/37.25 |
| 6,045,195 A | * | 4/2000 | Okamoto .................. | 301/37.25 |
| 6,120,104 A | * | 9/2000 | Okamoto et al. ........ | 301/37.25 |

* cited by examiner

Primary Examiner—S. Joseph Morano
Assistant Examiner—Long Bae Nguyen
(74) Attorney, Agent, or Firm—Charles R. Wilson (57) ABSTRACT

An image-holding assembly is intended for mounting over a wheel of a motor vehicle. The assembly has a base plate for attaching to the wheel, a non-rotatable disc mount coupled to the base plate and a disc cover secured to the non-rotatable disc mount. The disc cover carries a text, design or other desired image. The disc cover does not rotate with the wheel. The image remains discernable regardless of whether the vehicle is parked or is traveling along a roadway.

20 Claims, 6 Drawing Sheets

ASSEMBLY WITH A NON-ROTATABLE WHEEL COVER DISC

This application claims the benefit of U.S. Provisional Application No. 60/199,165, filed Aug. 17, 2000.

FIELD OF THE INVENTION

This invention relates to an assembly for use on a motor vehicle. More particularly, the invention relates to an image-holding assembly for attachment to a vehicular wheel to provide a means whereby an image on a cover disc attached to the assembly remains substantially stationary regardless of movement of the vehicle along a roadway.

BACKGROUND OF THE INVENTION

The wheels of most vehicles have decorative wheel covers, spokes, chromed surfaces, etc. to make them more pleasing to the eye. Wheel covers, in particular, have long been used on autos. They are typically highly polished and are adorned by a two dimensional design of some nature or a three dimensional stamped design. The wheel cover attaches directly to the wheel and rotates with the wheel. More recently built autos often have alloy wheels where the wheel itself is styled for a pleasing appearance. The wheels of tractor trailers are ordinarily less decorative. In particular, the wheels of the trailer are normally purely functional with no adornment of any nature other than a unicolor surface paint.

Attempts are constantly being made to produce unique wheel covers or treatments, particularly for autos and to a lesser extent for tractor trailers and other commercial vehicles. Most attempts are noticeable only when the vehicle is stationary. The faster the wheels rotate as the vehicle travels down the roadway, the lesser the ability to visually appreciate a wheel cover or treatment of any nature. Attempts have been made in the past to produce a wheel cover which does not rotate with the associated wheel. That is, any image, text or design on the wheel cover itself is always discernable because the wheel cover does not rotate with the wheel. Examples of such attempts can be found in U.S. Pat. Nos. 2,741,047, 2,759,282, 2,869,262, 2,954,629, 3,457,663, 3,495,347, 3,918,186, 4,280,293, 5,490,342 and 5,659,989. It is apparent that such attempts have not proved successful, likely because of excessive manufacturing costs, difficulty of installation, trouble-prone operation, and/or lack of operability under all travel conditions.

There has now been developed an assembly for use on a vehicular wheel which provides a desired styling effect. The assembly can be economically manufactured, is easy to install, is dependable for its intended use and provides an aerodynamic advantage during use. A cover disc on the assembly does not rotate as the wheel rotates during travel. Any image, whether text, a two dimensional design or a three dimensional design on the cover disc is always discernable.

SUMMARY OF THE INVENTION

An assembly is configured for mounting over a wheel of a vehicle. The assembly includes a non-rotatable cover disc which has an image on its surface which is discernable regardless of movement of the vehicle along a roadway. The assembly comprises (a) a base plate for fixedly attachment to the wheel and which rotates with the wheel, (b) a non-rotatable disc mount coupled to the base plate in a manner which allows the disc mount to remain substantially stationary while the base plate rotates, and (c) the cover disc secured to the disc mount. The cover disc bears an aesthetically pleasing image on its surface which does not rotate with the wheel and which can be appreciated by other motorists and pedestrians.

BRIEF DESCRIPTION OF THE INVENTION

DETAILED DESCRIPTION OF THE INVENTION

The image-holding assembly of the invention is intended for use on motor vehicles of all types, including autos, vans, SUV's, light commercial trucks and tractor trailers, including only the truck or only the trailer. It is particularly useful on the wheels of a tractor trailer since its wheels are normally unadorned and the assembly of the invention enhances the appearance at minimal cost. For this reason, the image-holding assembly is described in detail in the following paragraphs and with reference to the drawings where the trailer of a tractor trailer is illustrated. It should be understood that minor dimensional changes only are needed to adapt the described assembly for use on other vehicles.

Figure 1:
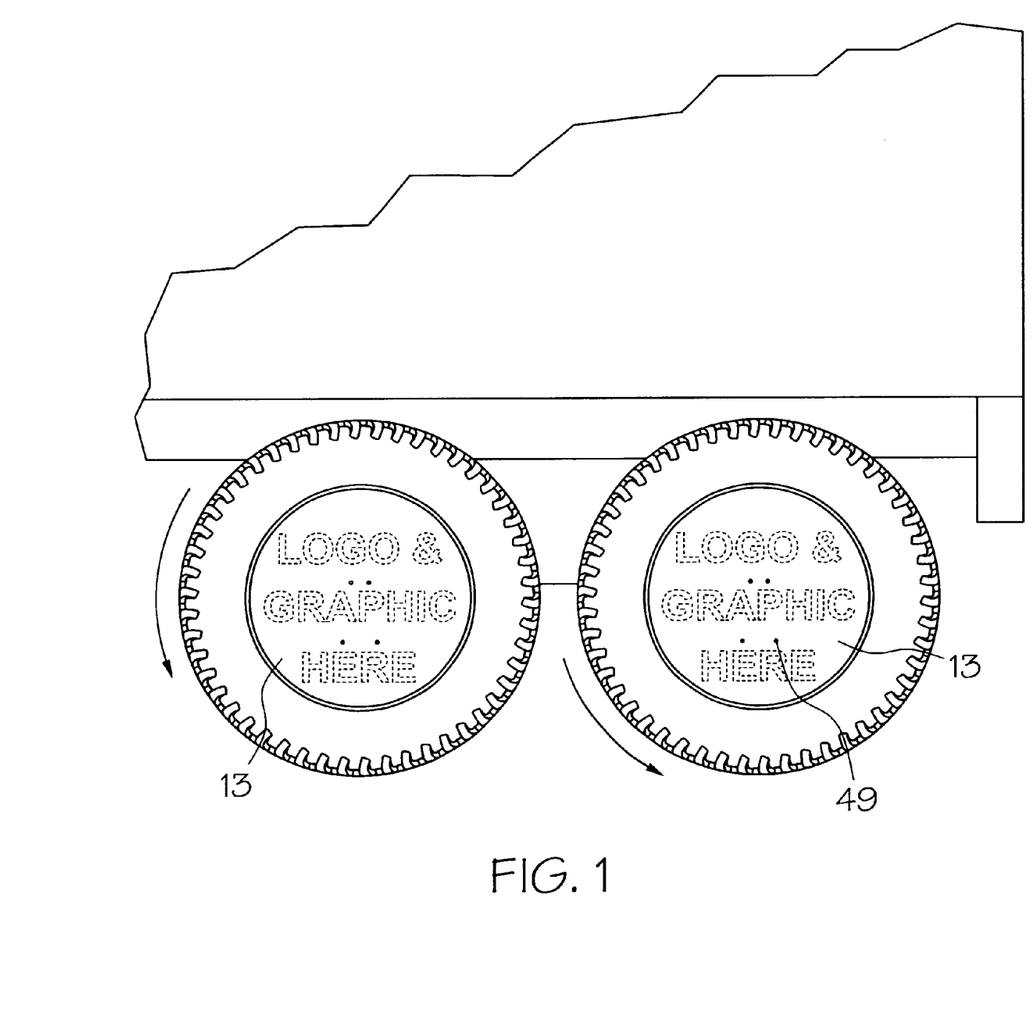
FIG. 1 is an environmental partial view of a trailer of a moving tractor trailer with the image-holding assembly of this invention mounted on two of its wheels.

FIG. 1 depicts the trailer portion of a tractor trailer as it is pulled along a roadway. As evident, two wheels each have a cover disc. The front cover disc has text on its surface and the back cover disc has the same text, though another image such as a two dimensional design can be painted on its surface. In each instance, the text and design are discernable regardless of the rotational speed of the vehicle's wheels. Any manner of text can be used. It can be informative in nature, such as identifying the vehicle's owner or conveying an advertising, political or other message. The design can be scenic or whimsical in nature. It can be two dimensional such as a painted scene. It can be three dimensional such as a stamped or machined appearance. As used in the context of this invention, any text, two dimensional design or three dimensional design are collectively referred to as an image. As should be apparent, the image can be applied to the front surface of the cover disc by any known means. The cover disc itself is preferably circular with a diameter of from about four inches to about eighteen inches. The cover disc can also have other shapes, e.g. triangular-shaped.

Figure 2:
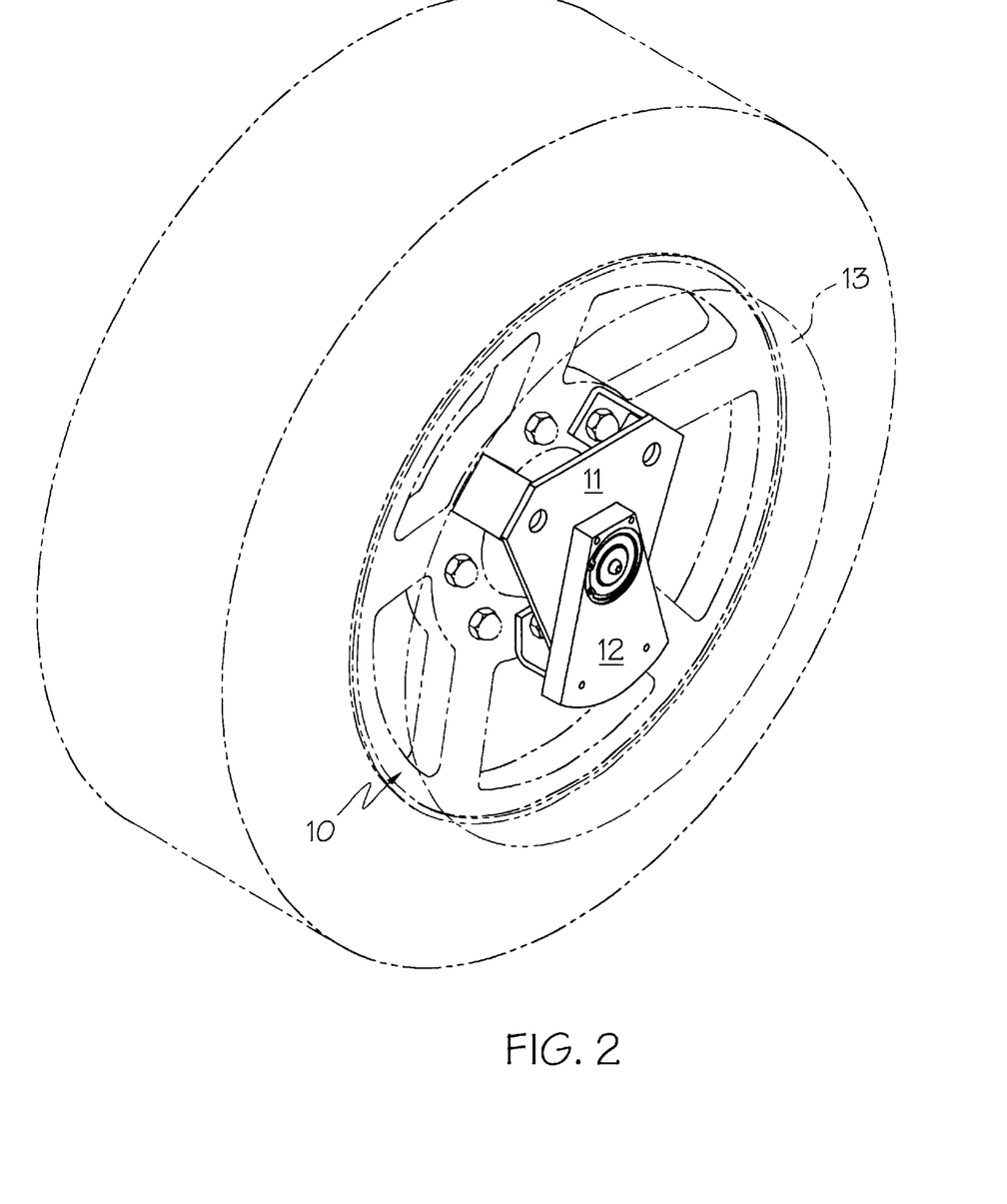
FIG. 2 is a perspective view of one wheel of the vehicle of FIG. 1 with a cover disc in phantom to show the balance of the imageholding assembly of the invention attached to the wheel.

With reference to FIG. 2, the assembly 10 of the invention comprises a base plate 11 attached to the wheel, a non-rotatable disc mount 12 coupled to the base plate and a cover disc 13 (shown in phantom) secured to the non-rotatable disc mount. The base plate 11, disc mount 12 and cover disc 13 are operatively connected together in a manner which secures the whole assembly 10 to the wheel of the vehicle in a manner which prevents the cover disc from 15 rotating while the wheel rotates. That is, the cover disc at all times remains substantially stationary relative to the wheel. The image on the cover disc is constantly substantially level or horizontal to the ground surface.

Figure 3:
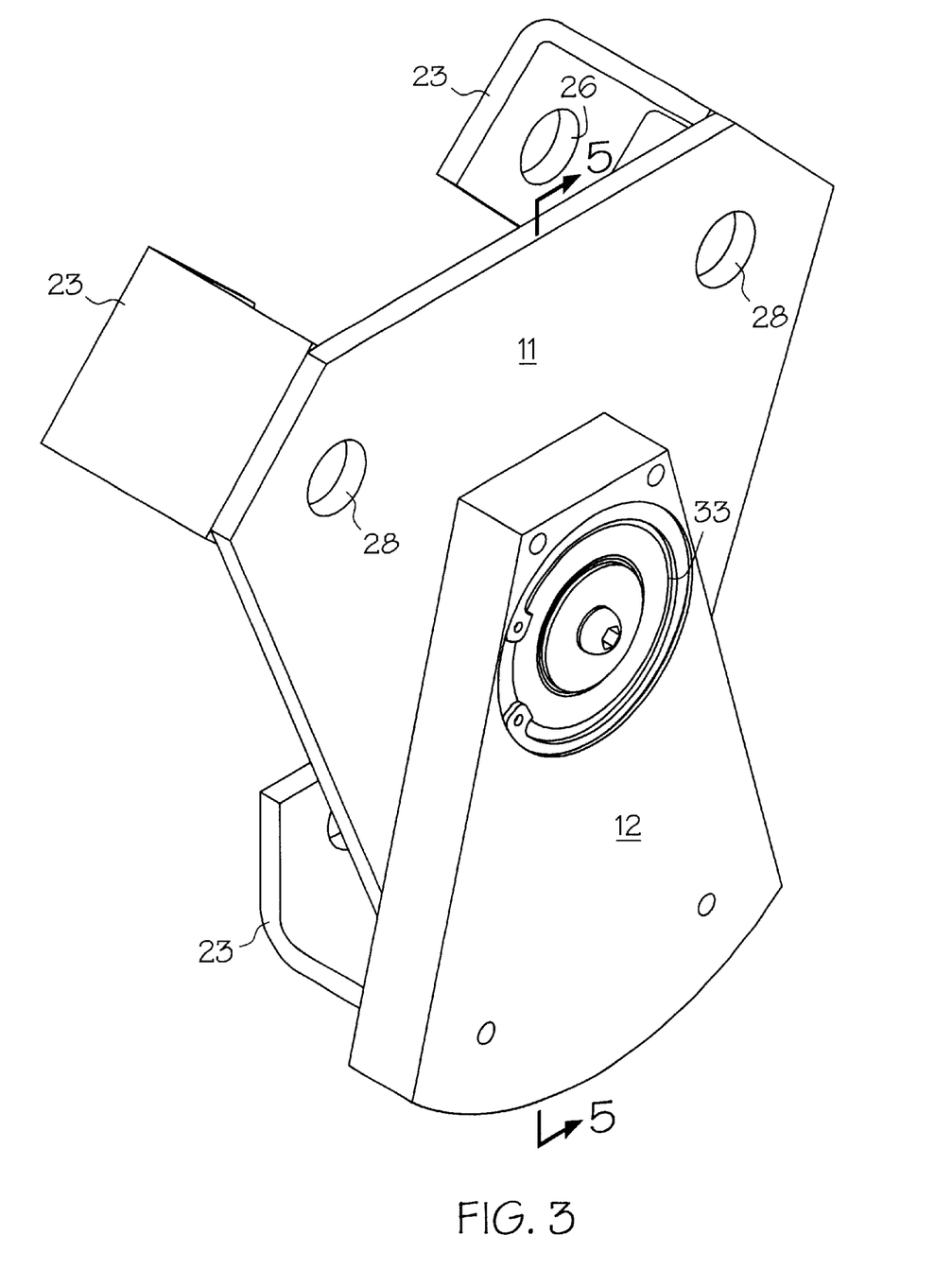
FIG. 3 is a view in perspective view showing the assembly of FIG. 2 in isolation without the cover disc for clarity.
Figure 4:
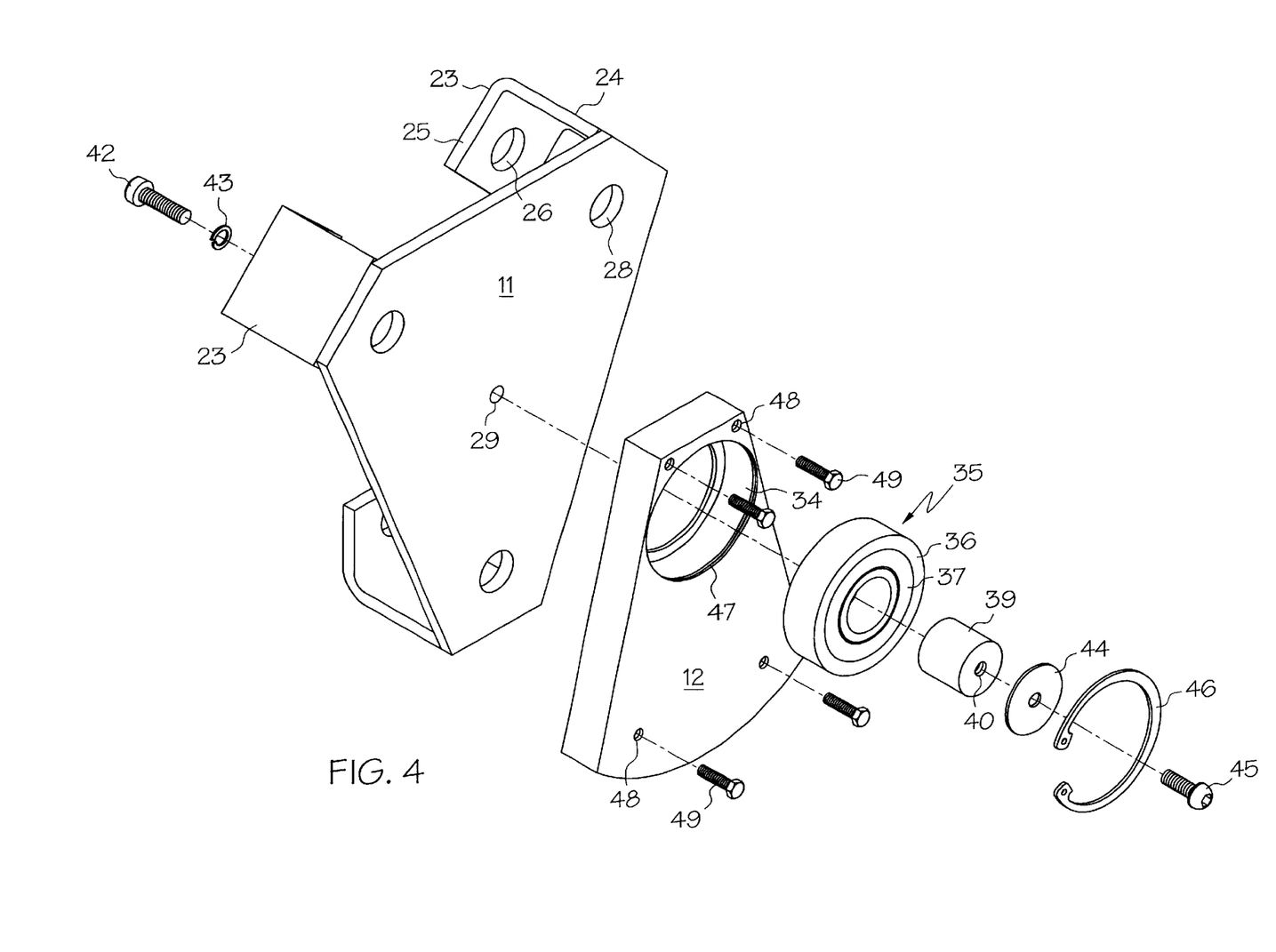
FIG. 4 is an exploded view of the assembly of FIG. 3.
Figure 5:
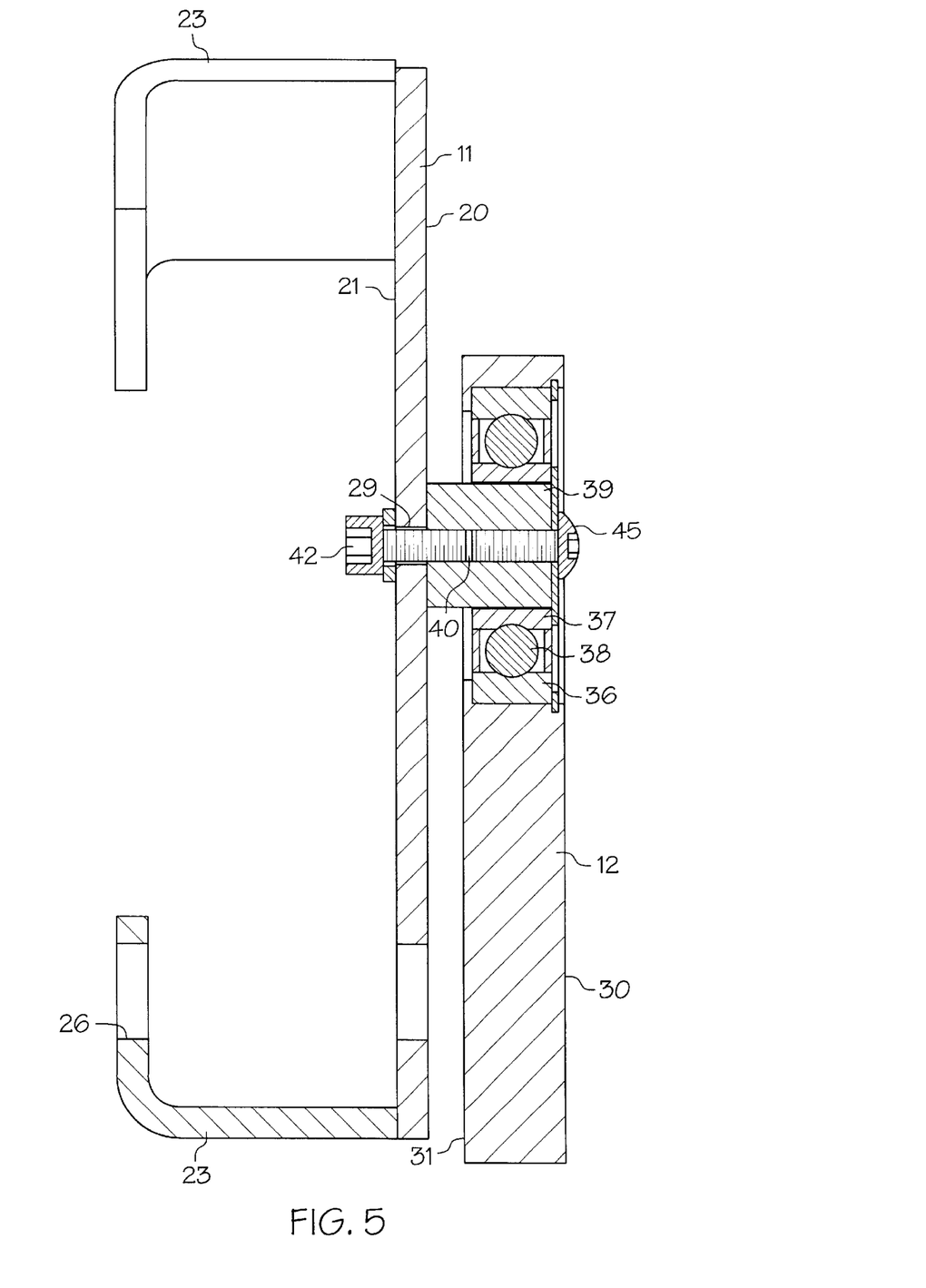
FIG. 5 is an elevational view in section of the assembly of FIG. 3.

As better seen in FIGS. 3–5, the base plate 11 has a substantially flat front face 20 and a substantially flat back face 21. It has a generally triangular shape with blunted corners. It further has at least three brackets 23, with each bracket extending from a blunted corner 22. The brackets 23 provide a means of fixedly attaching the base plate 11 to the wheel and also spacing 25 the base plate 11 away from the wheel so that the cover disc 13 can be positioned slightly off the wheel's rim, preferably flush with the wheel's rim. Each bracket 23 has a first leg 24 extending substantially perpendicularly from the base plate's back face 21 and a second leg 25 extending preferably inwardly at a substantial right angle to the first leg 24. The first leg 24 is about one inch to about four inches in length, depending on the particular wheel's depth as measured from the lug bolt holes to the wheel's rim and also depending on the wheel's configuration. The length of the second leg 25 is not critical. As evident in FIG. 4, the second leg 25 has a hole 26. The brackets 23 and the holes 26 in the brackets are spaced for alignment with the lug bolts normally used to hold the wheel to a brake drum, axle shaft flange or hub which rotates on the vehicle's axle spindle. Other attachment means for holding the base plate 11 to the wheel can be used.

Five lug bolts equi-distance from one another are standardized on most vehicles to hold the wheel. In accord with the embodiment of this invention depicted in FIGS. 1–5, at least three of those lug bolts are used to hold the base plate 11. The lug nuts can be removed and the base plate installed onto the lug bolts by slipping the holes of the brackets over them. The lug nuts are then tightened. For this purpose, optionally, a set of holes 28 is provided in the base plate 11 which are aligned directly over the holes 26 in the brackets 23. A socket wrench can then be inserted through each hole 28 and the lug nut tightened or loosened. Alternatively, the base plate 11 can be installed on the lug bolts directly over the lug nuts and another set of nuts used on the same bolts.

It should be understood that base plates having other shapes can be used. Its shape is primarily dependent on the number of brackets used for attachment to the wheel. As readily imagined, the base plate can also be generally four sided or five sided, with or without blunted corners. Ideally, for material and manufacturing savings reasons, the base plate is as small as possible with as few cuts and welds as possible.

It should be apparent that the base plate 11 is fixed to the wheel and rotates with the wheel. In accord with this invention, the disc mount 12 is coupled to the base plate 12 at a center point of the base plate 12. A center hole 29 in the center of the base plate as seen in FIGS. 4 and 5 is used to couple the disc mount 12 to the base plate 11. Further, the non-rotatable disc mount 12 is coupled to the base plate 11 in a manner such that it does not 15 rotate with the wheel. Rather, it remains stationary regardless of rotation of the wheel. As seen in FIGS. 2–5, the point of coupling for the disc mount 12 is off-center so that the disc mount's center of gravity is substantially below its point of coupling to the base plate 11. The disc mount 12 is generally pie-shaped with a substantially flat front face 30 and a substantially flat back face 31. A bearing system 33 is mounted in an off-center hole 34 positioned in an upper portion of the disc mount 12, substantially off-center.

The disc mount 12 weighs at least about two lbs., preferably from about four lbs. to about ten lbs. The disc mount's weight together with the off-center location of the bearing system 33 work in conjunction to provide sufficient inertia that the disc mount 12 will not rotate with the wheel regardless of wheel rotational speed or wheel acceleration rate.

Further with regard especially to FIGS. 4 and 5, the bearing system 33 comprises a ball bearing ring 35 with an outer ring 36 having an outer race tract, an inner ring 37 having an inner race tract and a set of ball bearings 38 trapped in the race tracts created by the outer and inner rings. A cylindrical-shaped bearing axle 39 with a threaded bore hole 40 extending longitudinally 10 along its axis is positioned within the inner ring 37. The off-center hole 34 in the disc mount 12 is dimensioned to receive the ball bearing ring 35. The ball bearing ring 35 is secured in the hole 34 by a bolt 42 and a lock washer 43 in a back side which extends through the center hole 29 of the base plate 11 and into the bearing axle 39. Further, a washer 44 and a bolt 45 engage the bearing axle 39 from a front side. A snap ring 46 positioned in a snap ring groove 47 which is machined in the off-center hole 34 near a front face of the disc mount 12 further helps to hold the bearing system in place.

The bearing system 33 is mounted to the disc mount 12 and secured to the base plate 11 so that the bearing system is centered on a center axis of the wheel and the vehicle's axle. This is accomplished in the embodiment of the invention of FIGS. 1–5 by having a center hole 29 in the base plate 11 and coupling the disc mount 12 to the base plate 11 by the bolt 42 passing through the center hole 29 and into the bearing axle's threaded bore hole 40.

Again with reference to FIG. 4, a set of threaded holes 48 are bored into the disc mount 12 at spaced locations. A corresponding number of aligned holes in the cover disc 13 are provided. Four bolts 49 pass through the holes in the cover disc and are threaded in the threaded holes 48 to securely hold the cover disc 13 to the disc mount 12, as best seen in FIG. 1.

Figure 6:
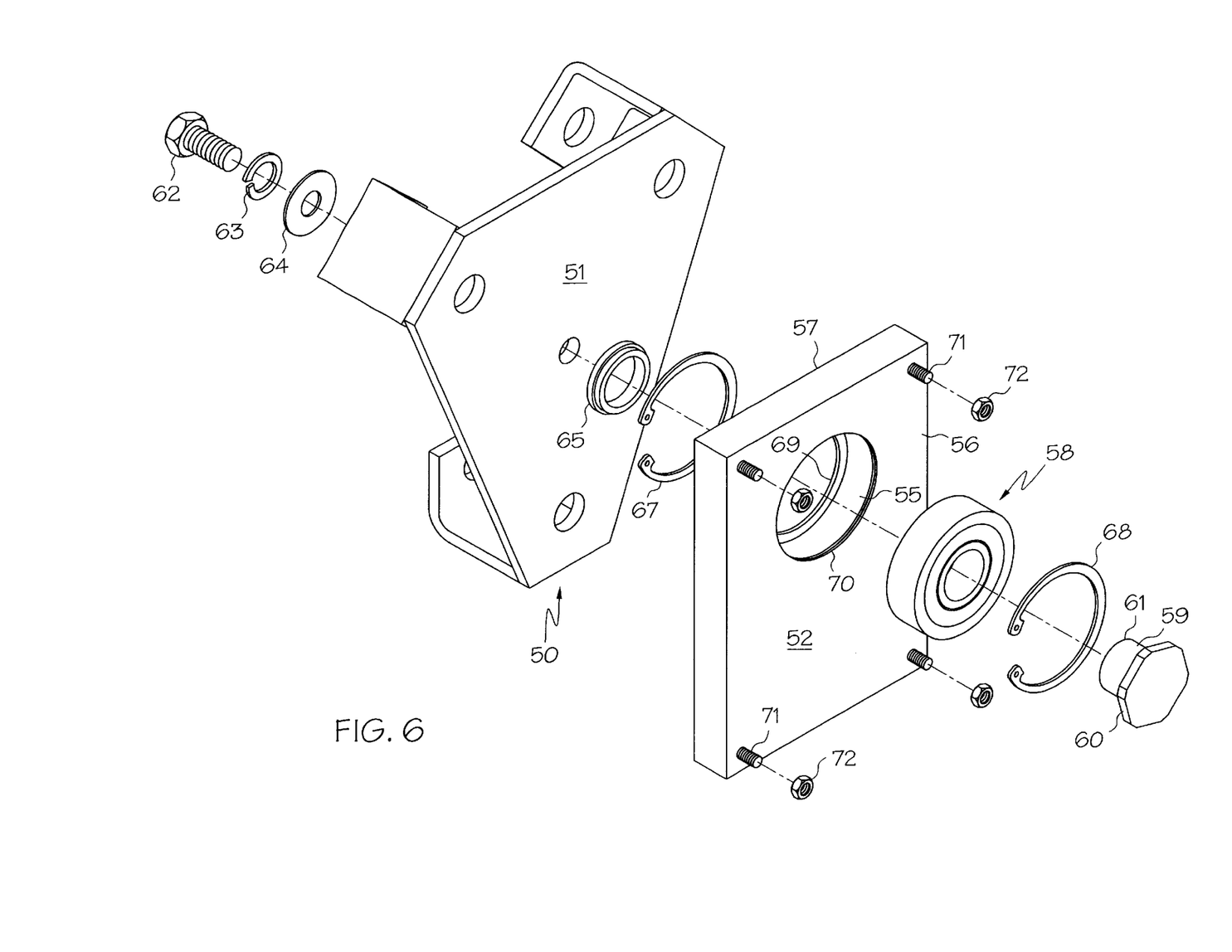
FIG. 6 is an exploded view of an alternative image-holding assembly of the invention with the cover disc removed for clarity.

FIG. 6 illustrates an alternative image-holding assembly of the invention. The assembly 50 comprises a base plate 51, a disc mount 52 and a cover disc (not shown for clarity purposes). The mode of operation of the assembly 50 is the same as that of image-holding assembly 10 described above. The base plate 51 and the cover disc are similar in construction to the base plate 11 and the cover disc 13 of the assembly 10. The disc mount 52, however, has a generally rectangular shape, has a different retention means for the ball bearing system and has a different means to hold the cover disc.

Still with reference to FIG. 6, the disc mount 52 is generally rectangular-shaped with an off-center hole 55 near an edge of an upper short side. The disc mount 52 has a substantially flat front face 56 and a substantially flat back face 57. It weighs at least about two lbs. and preferably weighs from about four lbs. to about ten lbs. The ball bearing ring 58 is similar to the ball bearing ring 35 described above. A bearing axle 59 extends through a center hole of the ball bearing ring. The bearing axle 59 has a cylindrical-shaped body with a retention ledge 60 on one end to fit snug against a front of the ball bearing ring 58 and a threaded hole 61 extending from another end along its longitudinal axis. The ball bearing ring 58 is retained in the disc mount's off-center hole 55 by a bolt 62 extending through the center hole of the base plate and into the threaded hole 61 of the bearing axle 59. A lock washer 63, washer 64 and spacer 65 are used with the bolt 62. The spacer 65 is to ensure that the disc mount 52 is spaced from the base plate 51 sufficiently to permit the base plate to rotate with the wheel without friction contact with the back face 57 of the disc mount 52. A snap ring 67 and a snap ring 68 are positioned in a back snap ring groove 69 and a front snap ring groove 70, respectively, machined into the off-center hole 55 to aid in properly positioning the ball bearing ring 58 in the disc-mount 52.

Again with reference to FIG. 6, a set of threaded studs 71 are provided to hold a cover disc to the disc mount 52. A threaded stud 71 is permanently fixed in each corner of the disc mount. The cover disc has aligned holes to slip over the threaded studs and is held in place by threading nuts 72 onto the threaded studs.

In use the image-holding assembly initially has its cover disc removed from the coupled base plate and disc mount to facilitate attaching the base plate to lug bolts on a vehicle's wheel. As should be apparent, one or more wheels of a vehicle can have its own image-holding assembly. Once the base plate is installed on the lug bolts and the lug nuts tightened, the cover disc is positioned over the disc mount and attachment means secured. Any image on the cover disc is now readily read or viewed by another motorist or pedestrian. When the vehicle's owner wants a new look, the cover disc is either readily removed from the disc mount and a new one installed or a new image applied directly over the old image. As apparent, the cover disc can be flush with the vehicle's wheel to provide a more aerodynamic effect with better gas mileage for the vehicle.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. An image-holding assembly for mounting over a wheel of a vehicle to receive a non-rotatable cover disc having an image on a surface which remains discernable during movement of the vehicle along a roadway, said image-holding assembly comprising:
   (a) a base plate for fixedly attaching to a wheel and rotating with the wheel, said base plate having a substantially flat front face and back face and further having at least three brackets extending inwardly from the back face, each of said at least three brackets having a hole to receive a lug bolt of the wheel;
   (b) a non-rotatable disc mount coupled to the base plate in a manner which allows the disc mount to remain substantially stationary while the base plate rotates with the wheel, said disc mount being configured to hold a cover disc; and
   (c) a cover disc secured to the non-rotatable disc mount, said cover disc bearing an image on an outer surface thereof,
whereby the disc mount remains in a substantially stationary non-rotating mode and an image on a cover disc held to the disc mount is always substantially horizontally disposed and discernable regardless of wheel movement.

2. The image-holding assembly of claim 1 wherein the disc mount is coupled to the base plate at a point off-center of the disc mount.

3. The image-holding assembly of claim 2 wherein the disc mount weighs at least about two pounds.

4. The image-holding assembly of claim 3 herein the disc mount weighs from about four pounds to about ten pounds.

5. The image-holding assembly of claim 3 herein the disc mount has a generally rectangular shape and its point of attachment to the base plate is near an upper short edge thereof.

6. The image-holding assembly of claim 5 wherein the disc mount is coupled to the base plate by a ball bearing system secured to the disc mount.

7. The image-holding assembly of claim 6 wherein the ball bearing system comprises a ball bearing ring having an outer ring and an inner ring, a bearing axle positioned within the inner ring and attachment means for holding the ball bearing ring to the disc mount.

8. The image-holding assembly of claim 7 wherein the base plate has a center hole and the bearing axle of the ball bearing system has a threaded hole extending along its longitudinal axis and the attachment means is a first threaded bolt extending through the center hole of the base plate and threadingly engaged to the bearing axle.

9. The image-holding assembly of claim 1 wherein the cover disc secured to the disc mount has a diameter of from about four inches to about eighteen inches.

10. The image-holding assembly of claim 9 wherein the cover disc has a set of spaced holes, the disc mount has a set of threaded holes in alignment with the spaced holes in the cover disc and further a set of bolts extend through the spaced holes of the cover disc and into the threaded holes of the disc mount.

11. The image-holding assembly of claim 9 herein the cover disc has a set of spaced holes and the disc mount has a set of threaded stud bolts extending outwardly therefrom to pass through the spaced holes in the-cover disc and further includes a set of nuts to hold the cover disc to the disc mount.

12. An image-holding assembly for mounting over a wheel of a vehicle to receive a non-rotatable cover disc having an image on a surface which remains discernable during movement of the vehicle along a roadway, said image-holding assembly comprising:
   (a) a base plate with attachment means for fixedly attaching to a wheel and rotating with the wheel, said base plate further having a center hole;
   (b) a non-rotatable unitary disc mount weighing at least about two pounds coupled by a bearing system to the base plate at the center hole of the base plate, said disc mount having a substantially flat back face adjacent the base plate, an opposed substantially flat front face and a hole extending from the back face to the front face for receiving the bearing system and further the disc mount's point of coupling through the bearing system is off-center of the disc mount whereby the disc mount remains substantially stationary while the base plate rotates with the wheel; and
   (c) a cover disc secured adjacent to the substantially flat front face of the non-rotatable disc mount, said cover disc bearing an image on an outer surface thereof,
whereby the disc mount remains in a substantially stationary non-rotating mode and an image on a cover disc held to the disc mount is always substantially horizontally disposed and discernable regardless of wheel movement.

13. The image-holding assembly of claim 12 wherein the disc mount weighs from about four pounds to about ten pounds.

14. The image-holding assembly of claim 12 wherein the ball bearing system comprises a ball bearing ring having an outer ring and an inner ring, a bearing axle positioned within the inner ring and attachment means for holding the ball bearing ring to the disc mount.

15. The image-holding assembly of claim 14 wherein the bearing axle of the ball bearing system has a threaded hole extending along its longitudinal axis and the attachment means is a first threaded bolt extending through the center hole of the base plate and threadingly engaged to the bearing axle.

16. The image-holding assembly of claim 12 wherein the cover disc secured to the disc mount has a diameter of from about four inches to about eighteen inches.

17. An image-holding assembly for mounting over a wheel of a vehicle to receive a non-rotatable cover disc having an image on a surface which remains discernable during movement of the vehicle along a roadway, said image-holding assembly comprising:

(a) a base plate with attachment means for fixedly attaching to a wheel and rotating with the wheel, said base plate further having a center hole;

(b) a non-rotatable disc mount having a set of spaced threaded holes and an off-center hole with a bearing system mounted in the off-center hole for,coupling said disc mount at the center hole of the base plate wherein a center of gravity of said disc mount is substantially below its point of coupling; and (c) a cover disc having a set of spaced holes in alignment with the spaced threaded holes in the disc mount and further having a set of bolts extending through the holes of the cover disc and into the threaded holes of the disc mount to semi-permanently secure,said cover disc to the non-rotatable disc mount, said cover disc bearing an image on an outer surface thereof, whereby the disc mount remains in a substantially stationary non-rotating mode while the base plate rotates with the wheel and an image on a cover disc held to the disc mount is always substantially horizontally disposed and discernable regardless of wheel movement.

18. The image-holding assembly of claim 17 wherein the disc mount is unitary and weighs at least two pounds.

19. An image-holding assembly for mounting over a wheel of a vehicle to receive a non-rotatable cover disc having an image on a surface which remains discernable during movement of the vehicle along a roadway, said image-holding assembly comprising:

(a) a base plate with attachment means for fixedly attaching to a wheel and rotating with the wheel, said base plate further having a center hole;

(b) a non-rotatable disc mount having a set of spaced threaded stud bolts extending outwardly thereform and off-center hole with a bearing system mounted therein for coupling said disc mount at the center hole of the base plate wherein a center of gravity of said disc mount is substantially below its point of coupling; and (c) a cover disc having a set of spaced holes in alignment with the threaded stud bolts of the disc mount to allow said cover disc to slip over the threaded stud bolts and further having a set of nuts threaded onto the stud bolts for semi-permanently securing said cover disc to the non-rotatable disc mount, said cover disc bearing image on an outer surface thereof, whereby the disc mount remains in a substantially stationary non-rotating mode while the base plate rotates with the wheel and an image on a cover disc held to the disc mount is always substantially horizontally disposed and discernable regardless of wheel movement.

20. The image-holding assembly of claim 19 wherein the disc mount is unitary and weighs at least two pounds.

* * * * *